C. B. BROWN.
Meal Bin and Sifter Combined.
No. 224,326.              Patented Feb. 10, 1880.
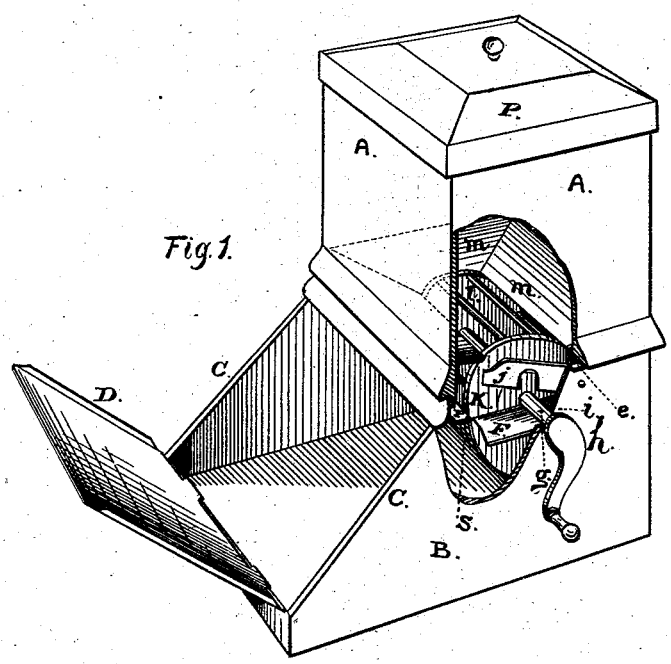
Fig. 1.
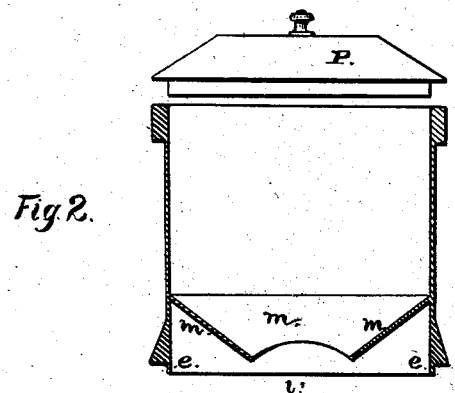
Fig. 2.
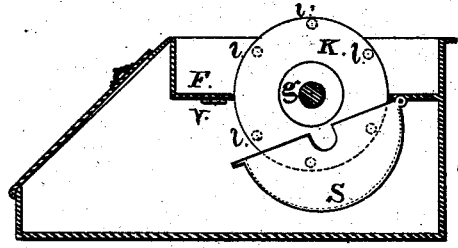
Witnesses:
Edward L. Osborn
Wm. H. Clark
Inventor:
Coolidge B. Brown
By Boomer Osborn
Attorneys.

UNITED STATES PATENT OFFICE.

COOLIDGE B. BROWN, OF PLACERVILLE, CALIFORNIA.

MEAL-BIN AND SIFTER COMBINED.

SPECIFICATION forming part of Letters Patent No. 224,326, dated February 10, 1880.

Application filed October 25, 1879.

*To all whom it may concern:*

Be it known that I, COOLIDGE B. BROWN, of Placerville, El Dorado county, State of California, have invented a certain new and useful Improvement in a Meal-Bin and Sifter Combined; and I do hereby declare that the following is a full, clear, and exact description thereof, reference being had to the accompanying drawings.

The object of my invention is to combine in one machine a flour or meal bin or box, a sifting device, and a receptacle or chamber for receiving the sifted flour, so that the meal or flour contained in the bin can be sifted into the lower chamber without removing it from the bin, all as hereinafter more fully described.

Referring to the accompanying drawings, Figure 1 is a view, in perspective, of my invention with a portion of the outside of the bin and chamber broken away to expose the interior; and Fig. 2 is a vertical longitudinal section thereof.

A is the flour bin or box, which is mounted upon the receiving-chamber B. The receiving-chamber has a sloping or inclined extension, C, on one side, which is formed by extending the sides and bottom and sloping the sides to the desired angle. A cover or door, D, is hinged to the lower part of the extension and closes down upon the inclined sides, so as to close it tight. The top of this chamber is made of the proper size to allow the lower end of the flour-bin A to fit down inside of it. The bin A has a projection or ledge, $e$, around its lower end, at a short distance above the lower edge, and this ledge rests upon the upper edge of the receiving-chamber when the lower edge of the bin has been slipped down into the upper end of the chamber, thus making a tight joint all around.

The chamber B has a horizontal partition, F, in it near its top, in which an opening is cut, as shown at Fig. 2. A shaft, $g$, extends across the opening and bears in grooves in the partition-plate F at each end of the opening. One end of this shaft extends through the side of the chamber and has a crank, $h$, on it. A disk, K, is secured on this shaft at each end of the opening, and the peripheries of the two disks are connected by rods $l\ l$ at intervals apart, so as to form a skeleton-cylinder, which can be rotated by turning the crank $h$. Underneath this cylinder I secure a semi-cylindrical wire-gauze sifter or concave, S, in which the lower half of the cylinder rotates. This wire concave I secure at one side by hinges, while the opposite side I fasten, when it is raised up, by means of a button, V, so that one side of it can be dropped down when it is desired to clean it out or remove any obstruction that tends to clog it.

To permit of the removal of the shaft and cylinder from the chamber when desired, I make a vertical slot, $i$, in the side of the chamber, through which the end of the shaft that extends through the side can pass in order to reach its seat. A button, $j$, is then turned down upon it to keep it in place.

Inside of the flour-bin A, near its bottom, I make a hopper-shaped semi-partition, $m$, the opening in which is nearly as large as the skeleton-cylinder, and the ends of which are concaved to fit the cylinder. A cover, P, fits on the top of the flour-bin A.

The meal or flour is emptied into the meal-bin and settles down through the hopper-opening into and around the skeleton-cylinder and rests upon the gauze concave. When it is desired to remove some of the flour the crank is turned, which causes the flour to be sifted through the gauze concave and fall into the lower or sifted-flour compartment, from which it can be removed through the door D.

This machine is very convenient, as a full sack of flour can be emptied into the bin at once, and it will settle down as it is sifted out until the entire quantity has been used.

One advantage gained by this arrangement of a permanent sifter is, that the flour or meal is always taken from the bottom, which keeps it stirred up and aerated, so that it does not heat and become deteriorated.

The cylinder can be removed whenever desired, in order to clean it and the gauze.

Having thus described my invention, what I claim, and desire to secure by Letters Patent, is—

The lower chamber, B, with its inclined extension C and cover D, and having the semi-partition F, with its gauze concave S and skeleton-cylinder K $l$, in combination with the flour or meal bin A, with its supporting-ledge $e$ and hopper-shaped bottom, all combined and arranged to operate substantially as and for the purpose described.

In witness whereof I have hereunto set my hand and seal.

COOLIDGE B. BROWN. [L. S.]

Witnesses:
I. S. HALL,
T. C. NUGENT.